(12) United States Patent
Egawa et al.

(10) Patent No.: US 6,226,148 B1
(45) Date of Patent: May 1, 2001

(54) MAGNETIC HEAD

(75) Inventors: Motoji Egawa; Satoshi Kawashima, both of Asaba-cho (JP)

(73) Assignee: Mineba Co., Ltd., Nagano (JP)

( * ) Notice: Subject to any disclaimer, the term of this patent is extended or adjusted under 35 U.S.C. 154(b) by 0 days.

(21) Appl. No.: 09/310,377

(22) Filed: May 12, 1999

(30) Foreign Application Priority Data

Jun. 29, 1998 (JP) .................................................. 10-181929

(51) Int. Cl.$^7$ .................................................. G11B 5/133
(52) U.S. Cl. .................................................. 360/125; 360/127
(58) Field of Search .................................................. 360/121, 128, 360/125, 127

(56) References Cited

U.S. PATENT DOCUMENTS 5,963,402 * 10/1999 Egawa et al. ..................... 360/125

FOREIGN PATENT DOCUMENTS 7-235013 9/1995 (JP).
10-40525 2/1998 (JP).

* cited by examiner

Primary Examiner—William Klimowicz
(74) Attorney, Agent, or Firm—Oliff & Berridge, PLC

(57) ABSTRACT

In a magnetic head, a second leg portion 10b with which a coil is not coupled is connected to a first long side $8_{2\ 1}$ (outer-body 8). Since the sectional area (thickness) is made larger in comparison to the conventional technique, thereby the magnetic resistance becomes lower and the read/write efficiency is increased. Since the second leg portion 10b is adapted to be connected to the outer-body 8 and thereby has a great rigidity, even if any shock is applied during assembling or while in use, the second leg portion 10b is prevented from being bent or generating cracks.

2 Claims, 8 Drawing Sheets

MAGNETIC HEAD

BACKGROUND OF THE INVENTION

1. Field of Invention

The present invention relates to a magnetic head for floppy disc drive.

2. Background of Related Art

Since, in general, a FDD (a floppy disc drive) is mounted in a personal computer, a magnetic head of the FDD is apt to generate a reading error due to an electromagnetic noise from a CRT or a switching electric source and so on. And, for preventing such a reading error of the magnetic head from being generated, it is a general tendency to shield the magnetic head with a magnetic material having a high permeability such as permalloy or ferrite (this general magnetic head is hereinafter referred to, for convenience sake, as a conventional example 1).

By the way, recently, in a note PC and such (a note-type of personal computer), low-profile FDD having a thickness of half-inch size has been used, and in this case, it has been difficult to shield a magnetic head with a magnetic material having a high permeability such as permalloy or ferrite. As a countermeasure, there is what is disclosed in JP Patent Laid-open Application No. Hei 7-235013 (hereinafter for convenience, referred to as a conventional example 2).

A magnetic head 1 of the conventional example 2, as shown in FIG. 6, comprises a front core 3, a back yoke 5 and a later described read/write coil 6 and an erasing coil 7. The front core 3 consists of a front chip core 2 having a read/write gap G1 and an erasing gap G2 and a first and a second sliders 4a and 4b of non-magnetic material which are integrated with the front chip core 2 slides on a magnetic recording medium (not shown). The one side (upper in FIG. 6) of the front core 3 slides on a magnetic recording medium (not shown). The back yoke 5 is made of a magnetic material having a high permeability such as Mn-Zn ferrite and bonded to the outer side of the front core 3.

The back yoke 5 is formed in the shape of approximately a hollow square pillar outer-body 8, a tip end of which is bonded to the above mentioned front core 3, a bottom portion 9 formed at the proximal side of the outer-body 8 and three approximately similarly shaped leg portions 10a, 10b and 10c (hereinafter referred to, for convenience sake, as the first leg portion, the second leg portion and the third leg portion viewing from right to left in FIG. 6) which stand upright in juxtaposing on the bottom portion 9 and forms a closed magnetic circuit with the front chip core 2 and the bottom portion 9 by being bonded to the front chip core 2 with the tip ends of the leg portions.

The outer-body 8 is formed in the shape of approximately a hollow square pillar with two opposing short sides (hereinafter referred to, for convenience sake, as a first short side $8_{1\_1}$ shown at right lower portion in FIG. 6 and a second short side $8_{1\_2}$ shown at left upper portion therein) and two opposing long sides (hereinafter referred to, for convenience sake, as a first long side $8_{2\_1}$ shown at right upper portion in FIG. 6 and a second long side $8_{2\_2}$ shown at left lower portion therein) and between the first short side $8_{1\_1}$ and the first leg portion 10a and between the second short side $8_{1\_2}$ and the third leg portion 10c on the bottom portion 9 respectively, an opening 11 is formed. From the opening 11 a lead wire 6a of the read/write coil 6 and a lead wire 7a of the erasing coil 7 are drawn out and connected to outer connecting terminals of such as not shown FPC (flexible print board).

The above-mentioned first and third leg portions 10a and 10c are inserted in the above mentioned read/write coil 6 and the erasing coil 7.

The back yoke 5 of this magnetic head 1 of the conventional example 2 is made of the magnetic material having a high permeability such as Mn-Zn ferrite and its outer-body 8 and the bottom portion 9 function in magnetic shielding. And in this case, since the back yoke 5 provided on the magnetic head 1 carries out magnetic shielding, a problem which has the difficulty of the magnetic shielding which is apt to be generated in the case of being used in the low-profile FDD can be planned to be improved.

By the way, the back yoke 5 is formed, as well as in forming method of any ceramics, in such a manner as, after powders of the Mn-Zn ferrite and such are mixed with any binder, which are molded in a given shape by using a mold, that molded product is sintered at a high temperature thereby to obtain a burnt-solidified product. Accordingly, there is an anxiety of generation of bending or any crack after sintering in the case of slimmer leg portions (10a, 10b and 10c).

To the contrary, in the magnetic head 1 of the conventional example 2 above mentioned, although the diameter of the first and the third leg portions 10a, 10c which are inserted in coils (the read-write coil 6 and the erasing coil 7) is necessary to make it slimmer comparing with the inner diameter of the coil, however, since there is no such limitation as to the second leg portion 10b which is not coupled with the coil, the diameter thereof is not necessarily made approximately similar with the first leg portion 10a and the third leg portion 10c. However, in the magnetic head 1 of the conventional example 2, since, even though the diameter of the first leg portion 10a and the third leg portion 10c is slimmer compared with the coil diameter, they are reinforced by the coupling of the coil and prevented from being broken, on the other hand the diameter of the second leg portion 10b is made approximately similar (approximately similar shape) with the first and third leg portions 10a and 10c, to that extent the strength of the second leg portion 10b becomes weak relatively, so that there was in fact the above problem i.e. anxiety of generation of bending and crack.

For that reason, there was not an appropriate improvement or countermeasure against such problem as the magnetic head 1 of the conventional example 2 has concerning the difficulty of providing magnetic shielding, which can be generated when used in a low-profile FDD.

Now, to the contrary to the conventional example 2 (FIG. 6), as one of the conventional example where the first, second and third leg portions 10a, 10b and 10c are made slimmer by a post-working (hereinafter referred to as "the third embodiment"), what is disclosed in JP Patent Laid-open No. Hei 10-40525 (hereinafter referred to, for convenience sake, as "the conventional example 3").

The magnetic head 1 of the conventional example 3, as shown in FIGS. 7 and 8, is provided with a front core 3 which is formed with the slider 4 and the front chip core 2 by coupling the front chip core 2 with a hole 12 formed on the slider 4, and the back yoke 5 which is made of a high permeability magnetic material which is formed as following process.

The back yoke 5, compared with the back yoke 5 of the above conventional example 2, is different in the structure in the points that the opening 11 is not formed on the bottom portion 9, that, on the second long side $8_{2\_2}$, the first projection 13a, second projection 13b and third projection 13c are formed in such a manner as those are extended toward the first leg portion 10a, the second leg portion 10b and the third leg portion 10c respectively and that a cut-out 14 is formed on the first short side $8_{1\_1}$ and the second short side $8_{1\_2}$.

And, in this back yoke 5, at the time of powder-molding and sintering, as shown in a dotted line 15 in FIG. 7, the first, second and third leg portions 10a, 10b and 10c are bonded to the outer-body 8 (the first, second and third projections 13a, 13b and 13c) and by a later post-working such as grooving work by cutting the dotted portion 15 in FIG. 7 to remove that portion, the first, second and third leg portions 10a, 10b and 10c are separated at a given width (thickness). By this cut-grooving, the cut-out 14 is formed on the first and second short sides $8_{1\_1}$ and $8_{1\_2}$. Through this cut-out 14, the lead wire 6a of the read/write coil 6 and the lead wire 7a of the erasing coil 7a are drawn out.

In this magnetic head 1 of the conventional example 3, its the first leg portion 10a, the second leg portion 10b and third leg portion 10c are bonded to the outer-body 8 at the time of being powder-molded and being sintered, thereby the generation of any bending or crack is prevented.

However, in the magnetic head 1 of the above conventional example 3 has the drawback in which, when working the first leg portion 10a, the second leg portion 10b and the third leg portion 10c by cutting into a given thickness, since not only the first leg portion 10a and the third leg portion 10c but also the second leg portion 10b which is not inserted in the coil is cut to the thickness similar to the first and third leg portions, to that extent the magnetic resistance of the magnetic head becomes large.

Further, since the first leg portion 10a and the third leg portion 10c are inserted in the coils (the read/write coil 6 and the erasing coil 7) and fixed with epoxy adhesives and such, the first and third leg portions 10a and 10c are in the state reinforced with coils (the read/write coil 6 and the erasing coil 7), thereby those are adapted to have the strength to resist sufficiently against any shock and the like during assembling or using to prevent them from being broken. However, since the second leg portion 10b is not inserted in the coil, the strength is maintained small and apt to be broken by any shock during assembling or using.

SUMMARY OF THE INVENTION

The object of present invention is, in the light of the above situation, to provide a magnetic head which can be planned to increase the strength and the efficiency of read/write function.

According to the first aspect of the present invention, a magnetic head comprises a front core, a back yoke and a read/write coil and erasing coil. The front core consists of a front chip core having read/write gap and erasing gap and a slider made of non-magnetic material. The one side of front core slider on a magnetic recording medium are integrated with front chip core. The back yoke made of a magnetic material to be bonded to the opposite side of the front core, wherein the back yoke is consisting of an approximately a hollow square pillar outer side body the tip end of which is connected to the front core, a bottom portion formed on the proximal end side of the outer side body and a plurality of leg portions which are provided on the bottom portion upright while contacting to the front chip core of the core with their tip end sides and form a closed magnetic circuit with the front body and the bottom portion, and coils are coupled with the leg portions except at least one of the leg portions, is characterized in that the leg portion which is not coupled with the coil is connected to the outer side body.

According to the second aspect of the present invention, in the first aspect of the of the present invention, the operation gap is formed with a read/write gap and an erasing gap, and the leg portions are adapted to consist of three ones which are juxtaposed, and characterized in that leg portions on both sides are coupled with the read/write coil corresponding to the read/write gap and the erasing coil corresponding to the erasing gap.

DETAILED DESCRIPTION OF PREFERRED EMBODIMENTS

Figure 6:
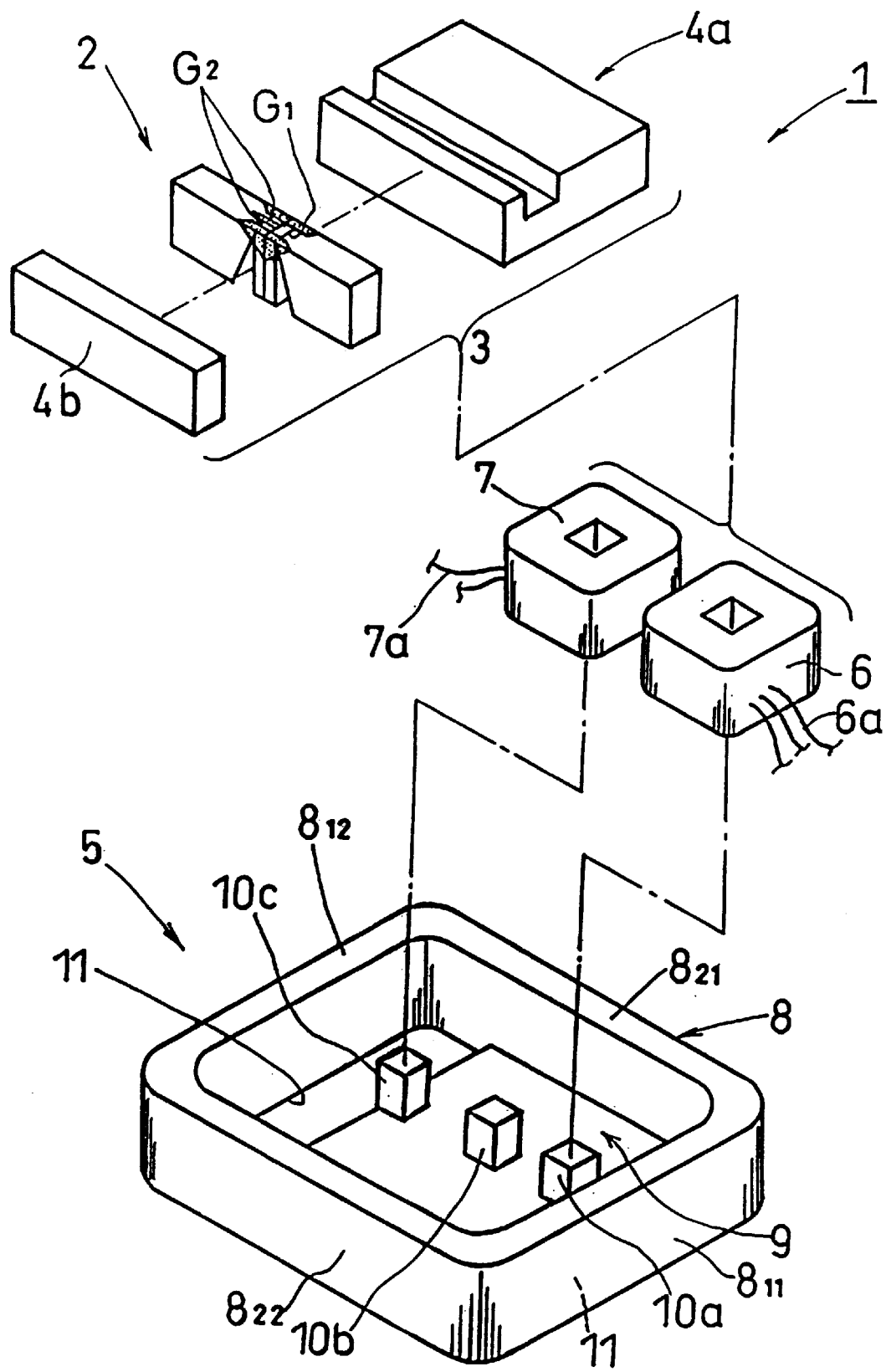
FIG. 6 is a broken perspective view of one of the conventional magnetic head.
Figure 7:
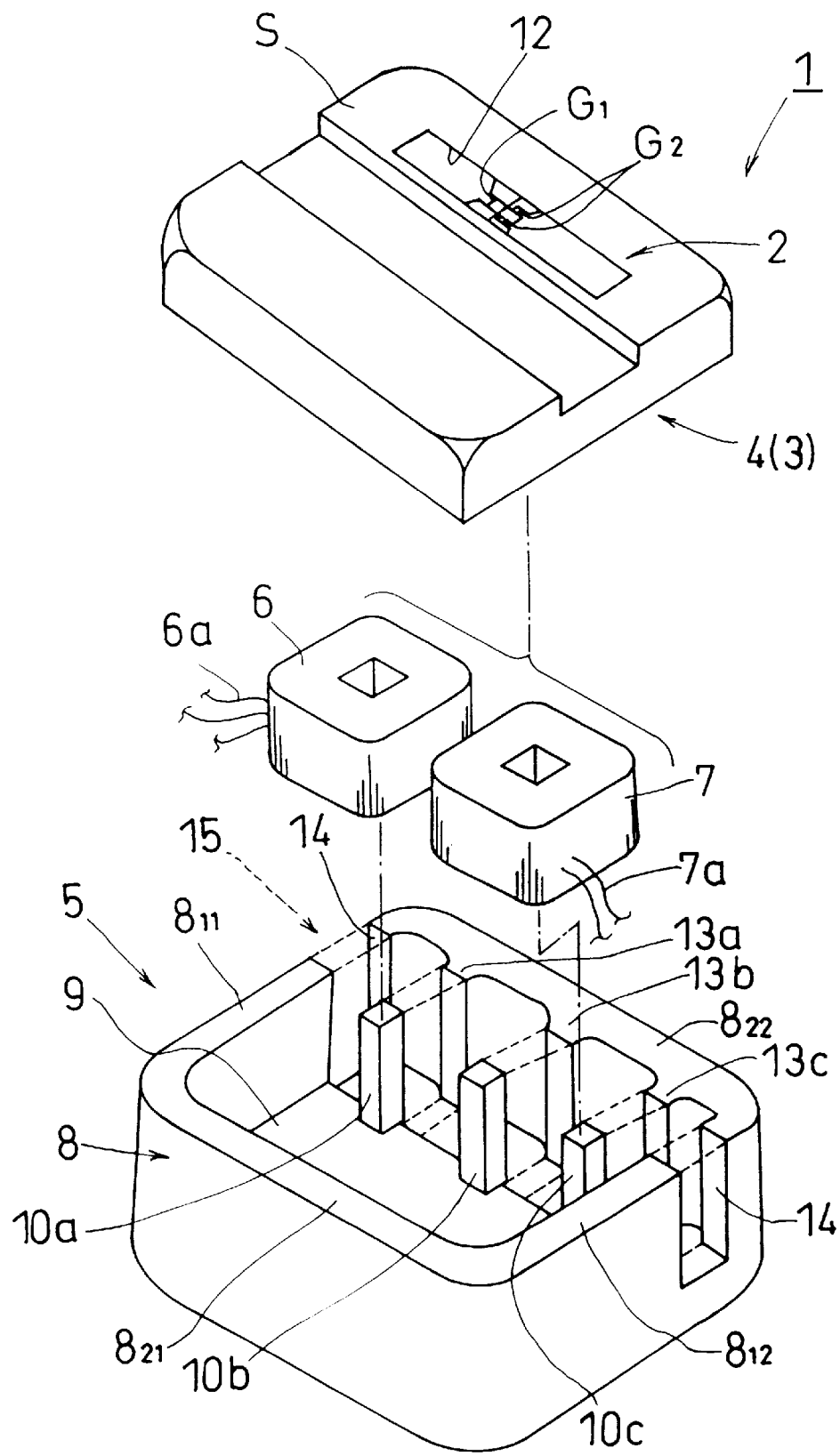
FIG. 7 is a broken perspective view of another example of the conventional magnetic head.
Figure 8:
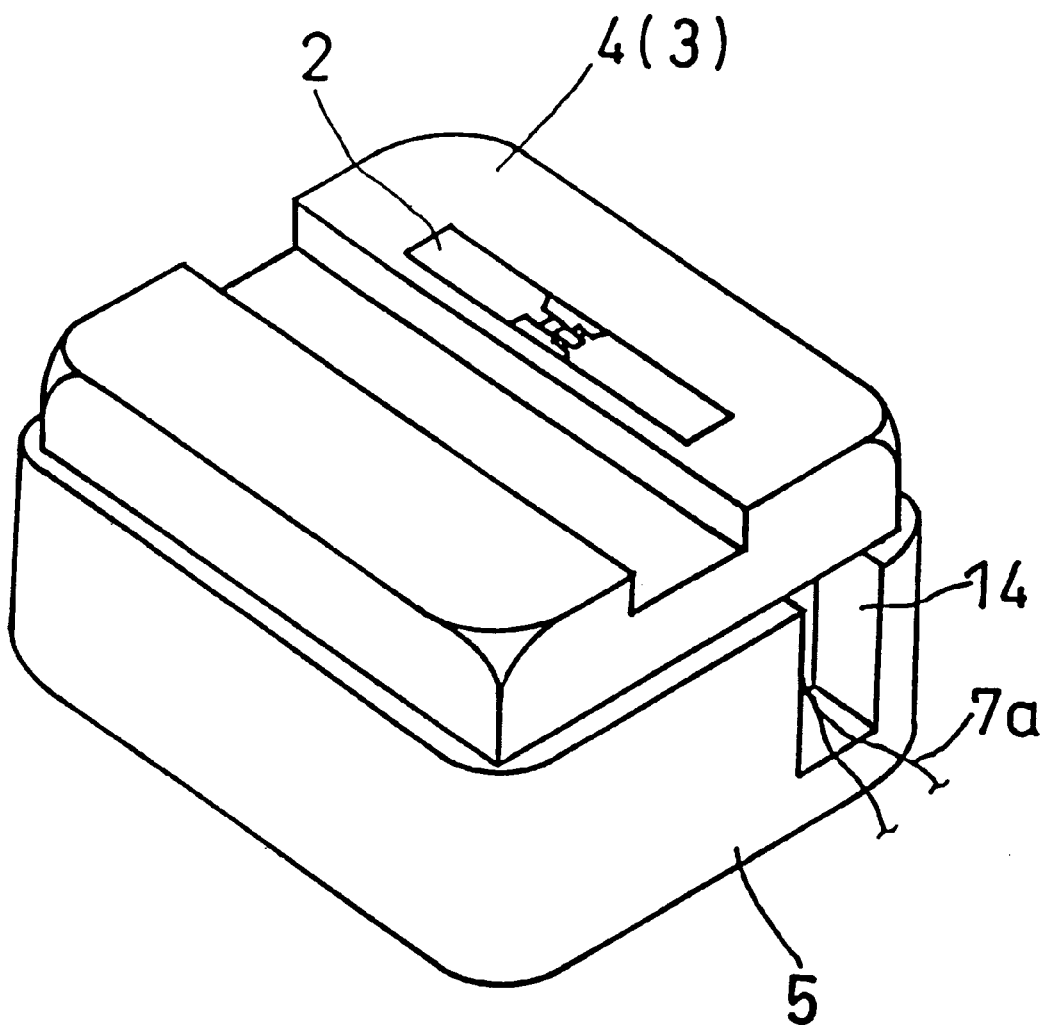
FIG. 8 is a perspective view of the front core of FIG. 7.

Hereinafter, the magnetic head 1 of the first embodiment of the present invention is explained based on FIG. 1. For reference, the signs of the identical members and parts corresponding to members and parts of FIGS. 6 to 8 are assigned with identical signs and their explanations are omitted appropriately.

Figure 1:
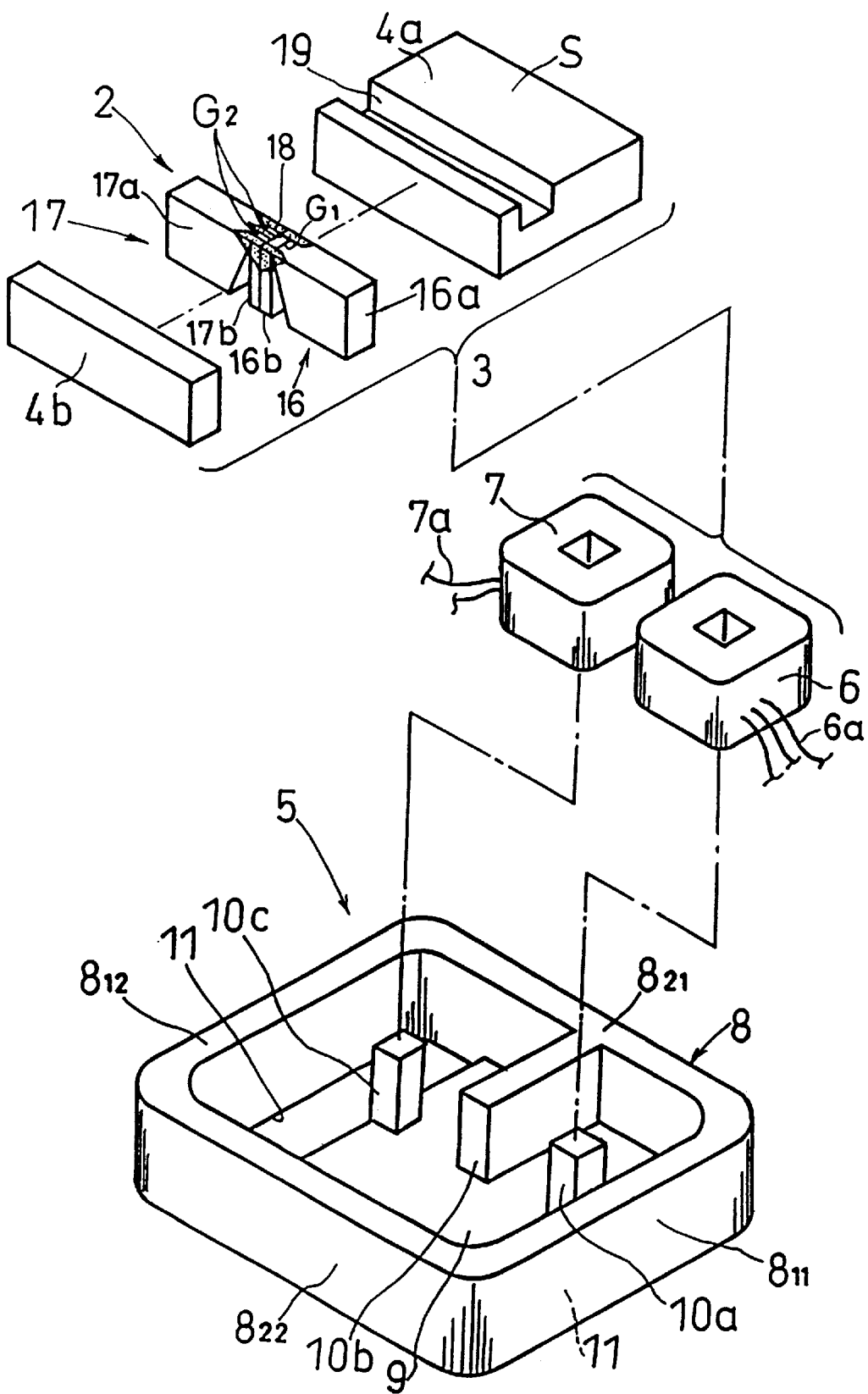
FIG. 1 is a broken perspective view of the first embodiment of the present invention.

The magnetic head 1 of the first embodiment comprises, in general as shown in FIG. 1, a front chip core 2 made of Mn-Zn ferrite having a read/write gap $G_1$ (operation gap) and an erasing gap $G_2$ (operation gap), the first and second slider 4a, 4b made of non-magnetic material such as calcium titanate which form the front core 3, one side (referred to as a sliding surface portion S shown at FIG. 1 upper side therein) of which is unified with the front chip core 2 with a low temperature glass or an epoxy adhesive and so on while clamping the front chip core 2 and slides on a magnetic recording medium (not shown), a back yoke 5 which is bonded to the other side of the front core 3 and made of magnetic material having a high permeability such as Mn-Zn ferrite and a read/write coil 6 and an erasing coil 7.

The front chip core 2 is made from a read/write core 16 and an erasing core 17 which is bonded with a non-magnetic adhesive (not shown) to this read/write core 16.

The read/write core 16 consists of an approximately trapezoidal read/write chip core 16a and an approximately square pillar-like sub read/write core 16b which are bonded with a glass 18, and at the connection point a read/write gap $G_1$ is formed. The erasing core 17 consists of an approximately trapezoidal erasing chip core 17a and an approximately square pillar-like sub erasing core 17b which are bonded with glass 18, and at the connection point an erasing gap $G_2$ is formed.

The read/write core 16 and the erasing core 17 are bonded with each other by the above non-magnetic adhesive interposed between the read/write sub core 16b and the erasing sub core 17b.

The first slider 4a is shaped approximately rectangular plate-like and on the sliding surface portion S a convex groove 19 extending along the longitudinal direction of the front chip core 2 is formed. The second slider 4b is shaped approximately square pillar-like.

The back yoke 5 is different from the back yoke 5 of the conventional example 2 in the point that the second leg portion 10b and the first long side $8_{2\ 1}$ (the outer-body 8) are connected with each other.

The back yoke 5 is adapted to be formed in such a manner as its first leg portion 10a is coupled with the read/write coil 6, the third leg portion 10c is coupled with the erasing coil 7, the tip end of the first leg portion 10a is connected to the read/write chip core 16a, the tip end of the third leg portion 10c is connected to the erasing chip core 17a and tip end of the second leg portion 10b is connected to the read/write sub core 16b and erasing sub core 17b. Thus, by connecting of the yoke 5 to each portion of the front chip core 2, a read/write closed magnetic circuit is formed from the read/write sub core 16b, the second leg portion 10b, the bottom portion 9, the first leg portion 10a and the read/write chip core 16a, and from the erasing sub core 17b, the second leg portion 10b, the bottom portion 9, the third leg portion 10c and the erasing chip core 17a an erasing closed magnetic circuit is formed.

The first leg portion 10a is coupled with the read/write coil 6 and bonded by the adhesive such as epoxy adhesive. The third leg portion 10c is coupled with the erasing coil 7 and bonded by the adhesive such as epoxy adhesive.

Thus formed magnetic head 1 is adapted to become what is connected between the second leg portion 10b and the first long side $8_{2\ 1}$ (the outer-body 8), and become possible to make large in the sectional area (thickness) of the second leg portion 10b compared with the conventional example 2 (i.e. to make use of the connecting portion of the second leg portion 10b and the first long side $8_{2\ 1}$ as one part of the second leg portion 10b), and thereby the magnetic resistance becomes lowered to increase the read/write efficiency.

Further, to the first and third leg portions 10a and 10c the read/write coil 6 and the erasing coil 7 are bonded with the adhesive and thereby the first leg portion 10a and the third leg portion 10c are reinforced. And, the second leg portion 10b is adapted to be connected to the outer-body 8, so that it is greatly reinforced. As a result, even if any shock and so on are applied during being assembled or used to the first, second and third leg portions 10a, 10b and 10c, those are prevent from being bent or generating any crack and so on.

Figure 2:
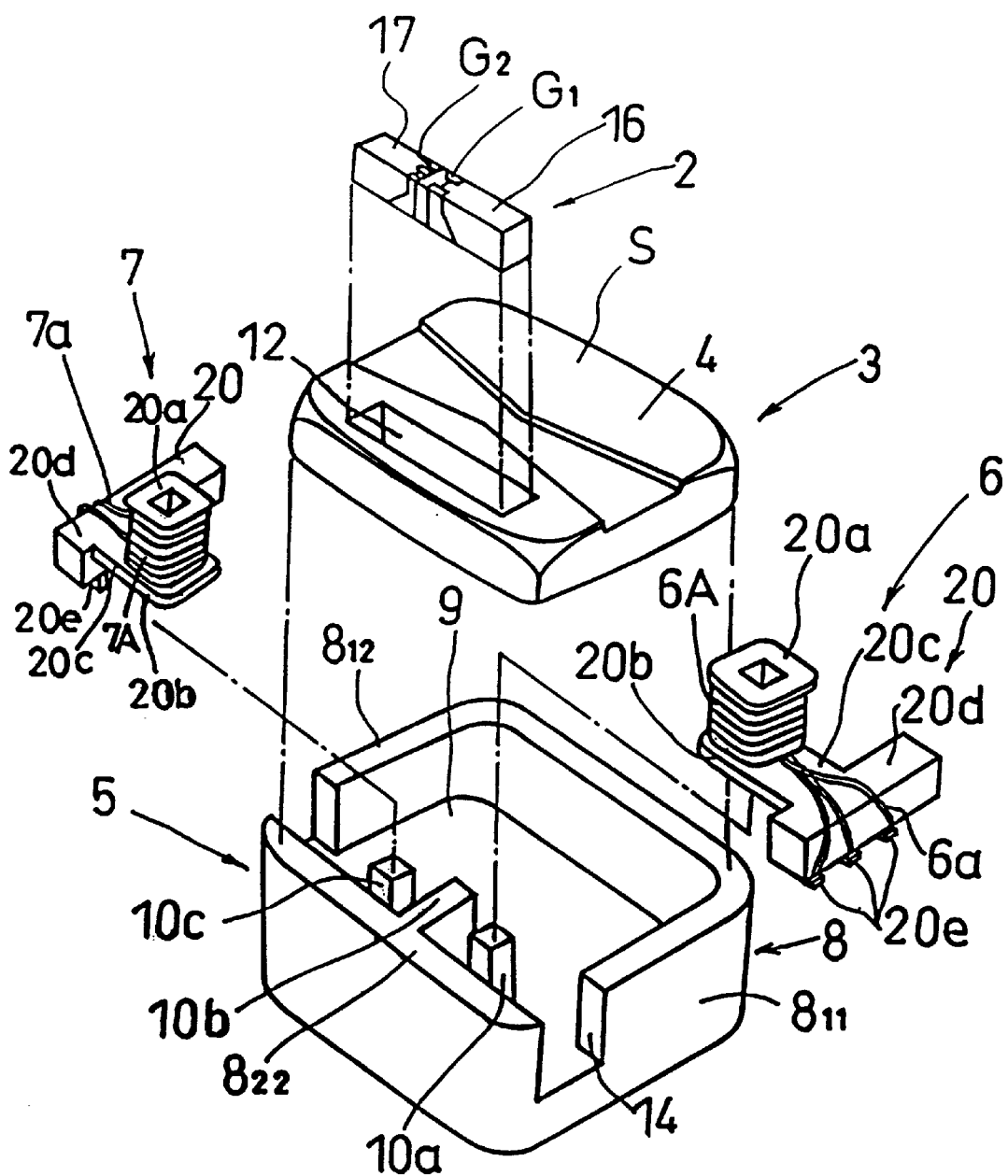
FIG. 2 is a broken perspective view of the second embodiment of the present invention.

Next, the second embodiment of the present invention is explained based on FIG. 2. For reference, the signs of the identical members and parts corresponding to members and parts of FIGS. 1 and 6 to 8 are assigned with identical signs and their explanations are omitted appropriately.

The magnetic head 1 of the second embodiment, as shown in FIG. 2, is in general formed with the front chip core 2 having the read/write gap $G_1$ (operation gap) and the erasing gap $G_2$ (operation gap), by coupling the front chip core 2, the slider 4 of the non-magnetic material formed with the sliding surface (sliding surface S) on one side thereof and forming the front core 3, the back yoke 5 of the magnetic material having a high permeability such as Mn-Zn ferrite to be connected to the other surface of the front core 3, the read/write coil 6 and the erasing coil 7.

The back yoke 5 has the shape of approximately a hollow square pillar outer-body 8, the tip end of which is connected to the slider 4 of the above front core 3, the bottom 9 formed at the proximal side of the outer-body 8 and the first, second and third leg portions 10a, 10b and 10c, which are juxtaposed in standing upright at the second long side $8_{2\ 2}$ in the bottom portion 9. In this case, the second leg portion 10b is adapted to be connected to the second long side $8_{2\ 2}$.

At the adjacent portions of the long side $8_{2\ 2}$ in the short side $8_{1\ 1}$ and $8_{1\ 2}$, cut-outs 14 are formed.

The read/write coil 6 and the erasing coil 7 are the coil of the type of bobbin with terminals obtained by being molded in a unit, in which the windings of the read/write coil 6 and the erasing coil 7 are held by the bobbin 20 made of a high heat resistance resin material.

The bobbin 20 comprises, in general, an approximately cylindrical bobbin body 20a with which the windings 6A and 7A of the read/write coil 6 and the erasing coil 7 are coupled, plate-like extended portions 20c extended from the flange portions 20b of the bobbin bodies 20a and having a width a little smaller than the cut-out 14, approximately square pillar like terminal stands 20d provided perpendicularly in a unitary manner with the tip ends of this extended portion 20c and metal made terminal pins 20e molded at the bottom of the terminal stand 20d in a unit with the terminal stand and to be connected to the outer terminals such as Flexible Printed Circuit (FPC) and such not shown. The lead 6a of the read/write coil 6 and the lead 7a of the erasing coil 7 are connected to the terminal pins 20e of the terminal stand 20d.

The read/write coil 6 is adapted to be accommodated in the cut-out 14 in which the extended portion 20c is disposed in the state where approximately cylindrical bobbin body 20a is inserted in the first leg portion 10a. And, in that state, the read/write coil 6 (bobbin 20) and the first leg portion 10a are bonded in a unit with resin adhesive such as epoxy adhesive.

And, the erasing coil 7 is adapted to be accommodated in the cut-out 14 in which the extended portion 20c in the state where approximately cylindrical bobbin 20a is disposed is inserted in the third leg portion 10c. And, in that state, the erasing coil 7 (bobbin 20) and the third leg portion 10c are bonded in a unit with resin adhesive such as epoxy adhesive.

In thus formed magnetic head 1, the second leg portion 10b and the second long side $8_{2\ 2}$ (the outer-body 8) are adapted to be connected, and it becomes possible to make the sectional area of the second leg portion 10b large compared with the conventional example 2 of FIG. 6 (to make use of one part of the connected portion between the second leg portion 10b and the second long side $8_{2\ 2}$), and thereby the magnetic resistance is lowered and the read/write efficiency can be increased.

Further, on each of the first and third leg portions 10a and 10c, the read/write coil 6 (bobbin 20) and the erasing coil 7 (bobbin 20) are bonded respectively, the increase of the rigidity of the first and third leg portions 10a and 10c is realized. Further, the second leg portion 10b is adapted to be connected to the outer-body 8, so that it has been greatly reinforced. Thereby, if any shock is applied to the first, second and third leg portions 10a, 10b and 10c during assembling operation, any bending or cracking can be prevented from being generated.

Figure 3:
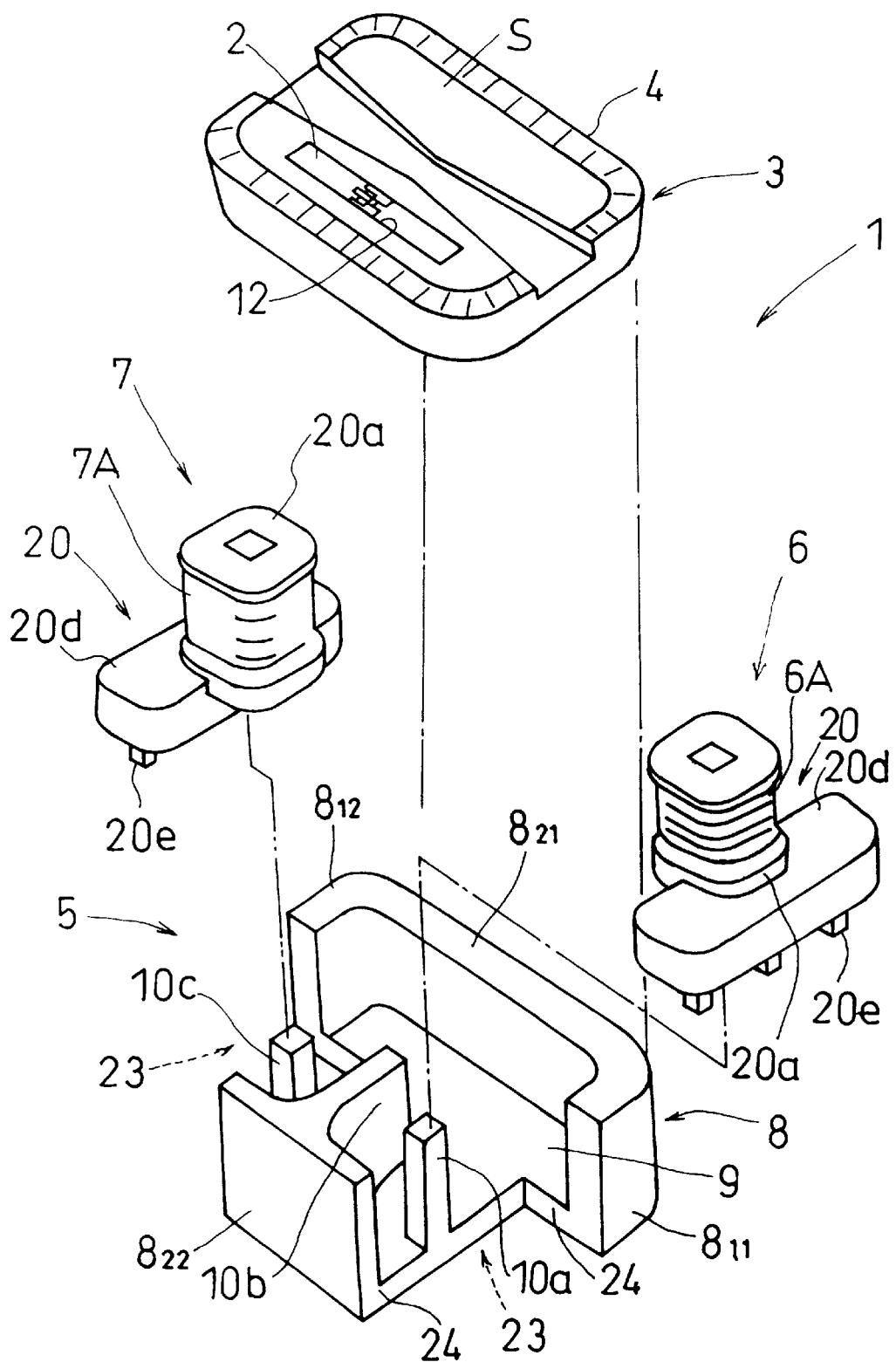
FIG. 3 is a broken perspective view of the third embodiment of the present invention.
Figure 4:
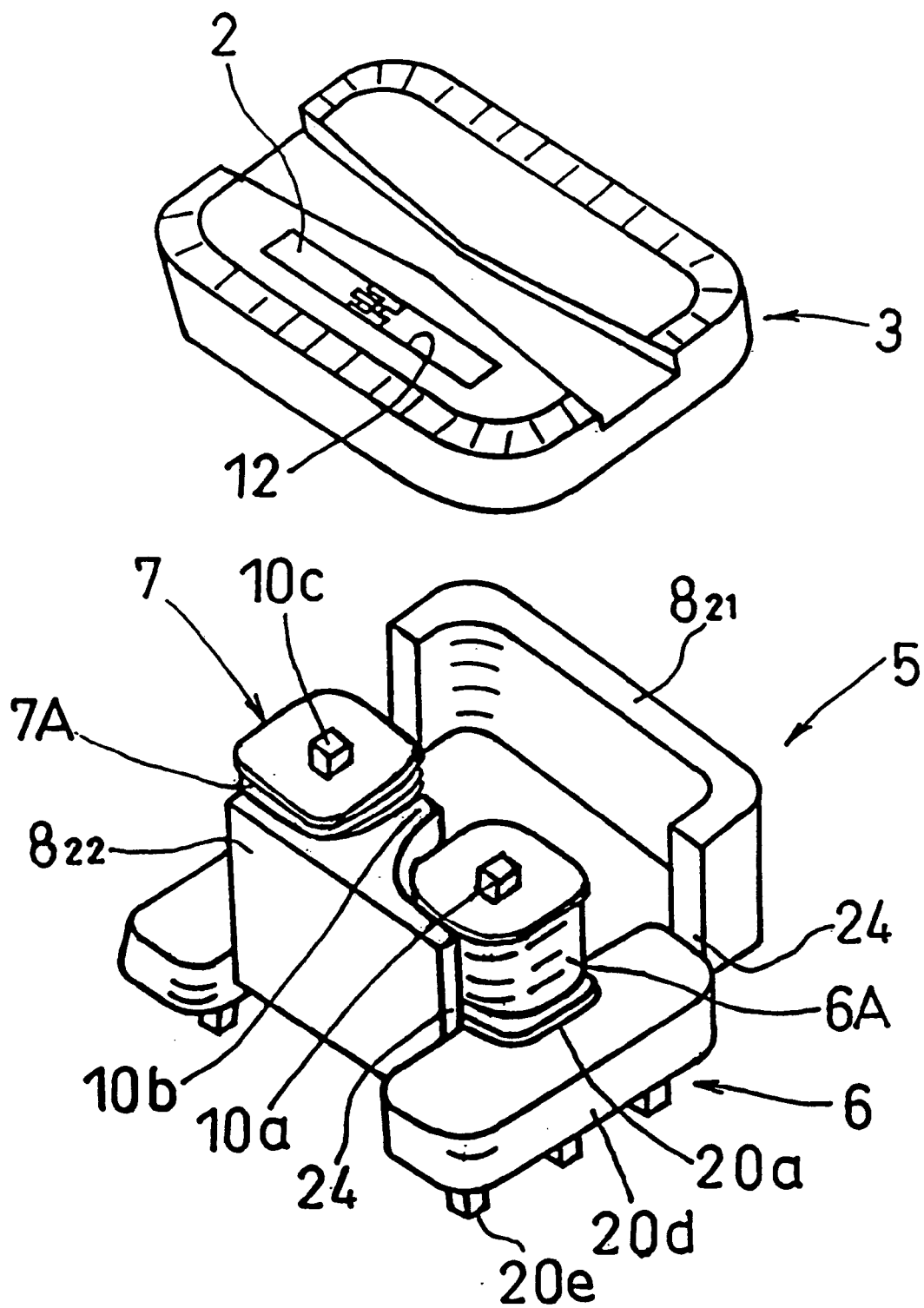
FIG. 4 is a broken perspective view of the case where the read/write coil and the erasing coil are assembled on the back yoke of FIG. 3.
Figure 5:
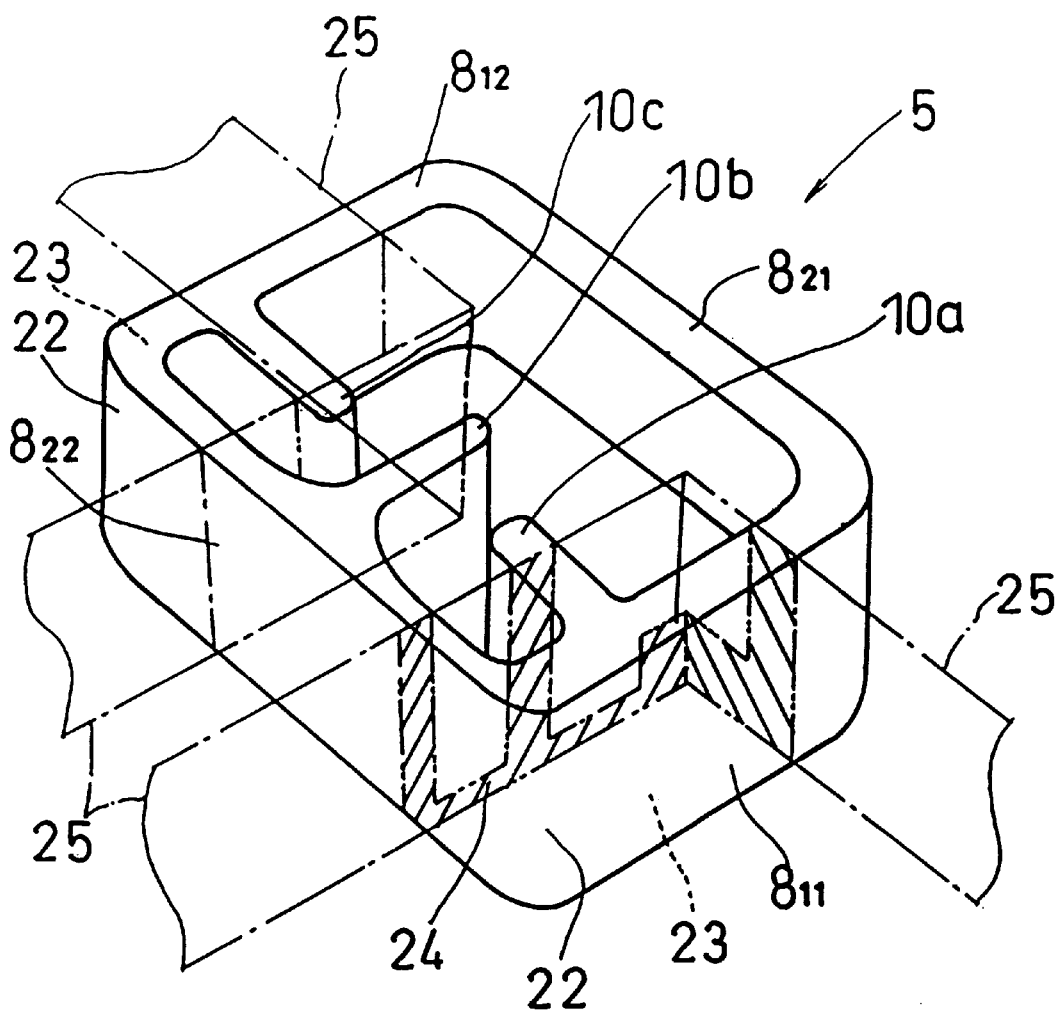
FIG. 5 is a perspective view of schematically showing how to prepare the back yoke of FIG. 3.

Next, the third embodiment of the magnetic head 1 of the present invention is explained based on FIGS. 3 to 5. For reference, the same signs which are used to the corresponding to the same member or part illustrated in FIGS. 1, 2, 6 to 8 are used in this embodiment and omitted their explanations.

The magnetic head 1 illustrated in the third embodiment is, as shown in FIGS. 3 to 5, mainly different from the above mentioned second embodiment (FIG. 2) in the points that a cut-out 23 is formed at the corner between the first and second short sides $8_{1\ 1}$ and $8_{1\ 2}$ of the back yoke 5 and the second long side $8_{2\ 2}$ and that there are provided other structure in place of the read/write coil 6 and the erasing coil 7 which are formed with the bobbin 20 in a unit manner in FIG. 2 (the terminal stand 20d and the bobbin 20a are formed separately).

The cut-out 23 is adapted to include a nearby portion of the corner portion 22 of the bottom portion 9, the first and second short sides $8_{1\ 1}$ and $8_{1\ 2}$ and second long side $8_{2\ 2}$.

Each bobbin 20 of the read/write coil 6 and the erasing coil 7 comprises, in general, the approximately cylindrical bobbin body 20a into which winding of the read/write coil 6 or erasing coil 7 is coupled, an approximately square pillar shaped terminal stand 20d held by the flange portion 20b of the bobbin 20a, the metal made terminal pins 20e molded in a unit with the lower side of the terminal stand 20d and to be connected to a not shown outer-connecting terminals such as FPC. The lead 6a of the read/write coil 6 and the lead 7a of the erasing coil 7 are connected to the terminal pins 20e.

The read/write coil 6, in the state where the approximately cylindrical bobbin body 20a is inserted in the first leg portion 10a, is adapted to be positioned in such a manner as the terminal stand 20d is positioned at the place where the cut-out 23 is formed. In this case, the terminal stand 20d is adapted to abut to the cut-out forming wall portion 24 including the bottom portion 9. And, in that state, the read/write coil 6 (bobbin 20) and the first leg portion 10a are formed in a unitary manner with adhesive such as epoxy adhesive.

Further, the erasing coil 7, in the state where the approximately cylindrical bobbin body 20a is made to be inserted in the third leg portion 10c, is arranged in such a manner as the terminal stand 20d is positioned at the portion at which the cut-out 23 is formed. In this case, the terminal stand 20d is adapted to abut to the cut-out forming wall portion 24 including the bottom portion 9. And, in that case, the read/write coil 6 and the third leg portion 10c are formed in a unitary manner with the adhesive such as epoxy adhesive.

Next, a manufacturing method of the above mentioned back yoke 5 is explained based on FIG. 5.

The back yoke 5, as shown in FIG. 5, the outer-body 8 of which is made in the shape of approximately a hollow square pillar, comprises the steps of making first leg portion 10a contacted to the first short side $8_{1\ 1}$, making the second leg portion 10b to the second long side $8_{2\ 2}$, making the third leg portion 10c to the second short side $8_{1\ 2}$, and making and sintering processes are carried out. Thereafter, the aforementioned cut-out 23 is formed by applying a cutting machining (post-machining) in the area circled by one dotted line 25 in FIG. 5. At that time of forming the cut-out 23, the connected portion between the first leg portion 10a and the first short side $8_{1\ 1}$ and the connected portion between the third leg portion 10c and the second short side $8_{1\ 2}$ are cut to make the thickness of the first, third leg portions 10a, 10c into a desired one.

In thus formed magnetic head 1, the second leg portion 10b and the second long side $8_{2\ 2}$ (the outer-body 8) are adapted to be connected, it becomes possible to form the sectional area of the second leg portion 6 (to make use of the connected portion between the second leg portion 10b and the second long side $8_{2\ 2}$ as one portion of the second leg portion 10b) large, thereby, the magnetic head resistance is lowered and the read/write efficiency is increased.

Further, to the first and third leg portions 10a and 10c the read/write coil 6 and erasing coil 7 are bonded with the adhesive in order to reinforce the first leg portion 10a and the third leg portion 10c. And, the second leg portion 10b is adapted to be connected to the outer-body 8, thereby it has the great rigidity. As a result, even if the first leg portion 10a, the second leg portion 10b and the third leg portion 10c are applied with any shock during assembling or being in use, they can be prevented from being bent and generating any crack.

In addition, since the first leg portion 10a and the third leg portion 10c which are coupled with the coils (the read/write coil 6 and the erasing coil 7) are able to be arranged in dimension (thickness and width) by a post-working process, the sectional areas of the first leg portion 10a and the third leg portion 10c are possible to make the dimension (thickness) to the minimum one, and to that extent those can be miniaturized. This dimension (thickness) arrangement is carried out by a cutting work (a mechanical working), so that the precision of the first leg portion 10a and the third leg portion 10c is increased, accordingly the clearance to the inner diameter of the coil (the inner diameter of the bobbin body 20a) can be made minimum, thereby the magnetic head 1 can be miniaturized.

In each of the above mentioned embodiments, since the magnetic head 1 has the read/write gap $G_1$ (operation gap) and the erasing gap $G_2$ (operation gap), compared with the case where the read/write gap $G_1$ and the erasing gap $G_2$ are provided respectively on each individual magnetic head the read/write operation of any information and the erasing operation can be carried out in a high precision.

For reference, the present invention is not limited to what is provided with the read/write gap $G_1$ and the erasing gap $G_2$ in one magnetic head, for instance, in FIG. 1, the magnetic head 1 can be constituted by omitting the erasing gap $G_2$, the erasing coil 7 and the third leg portion 10c. In that case too, since the second leg portion 10b is connected to the outer-body 8, the rigidity of the magnetic head 1 can be increased. And, in the case where the erasing gap $G_2$, the erasing coil 7 and the third leg portion 10c are thus omitted, the portions of the front core 3 and the back yoke 5 corresponding to such omitted members can be managed without those portions, thereby the magnetic head can be accordingly miniaturized.

According to one feature of the present invention, since one leg portion with which any coil is coupled is adapted to be connected to the outer-body of the back yoke, the sectional area (thickness) of the leg portion can be made large, thereby the magnetic resistance is lowered to increase the read/write efficiency. Further, since the leg portion is connected to the outer-body, the rigidity thereof is increased, even if any shock is applied during assembling process and being in use, the leg portion is prevented from being bent or generating any crack.

According to another feature of the present invention, since the magnetic head comprises the read/write gap as an operating gap and the erasing gap, the read/write and the erasing of the information can be carried out in a high precision.

What is claimed is:

1. A magnetic head comprising:

a front chip core having operation gaps, a slider made of a non-magnetic material forming a front core one side of which slides on a magnetic recording medium while being in a unit with the front chip core, and a back yoke made of a magnetic material to be connected to the side of the front core, wherein the back yoke comprises a hollow square pillar-like outer-body, the tip end of which is connected to the front core, a bottom portion formed at the proximal side of the outer-body and a plurality of leg portions which are provided upright on the bottom portion and the tip ends of which are connected to the front chip core and forms a closed magnetic circuit with the front chip core and the bottom portion, the leg portions except at least one are coupled with coils and the leg portion which is not coupled with the coil is unitarily formed with the outer-body so as to be directly connected to the outer-body.

2. The magnetic head according to claim 1, wherein said leg portions are juxtaposed in three, and the leg portions on both sides are coupled with a read/write coil and an erasing coil respectively.

* * * * *